United States Patent
Mandhani et al.

(10) Patent No.: US 9,600,433 B2
(45) Date of Patent: *Mar. 21, 2017

(54) SYSTEM, APPARATUS AND METHOD FOR INTEGRATING NON-PERIPHERAL COMPONENT INTERCONNECT (PCI) RESOURCES INTO A PERSONAL COMPUTER SYSTEM

(71) Applicant: INTEL CORPORATION, Santa Clara, CA (US)

(72) Inventors: Arvind Mandhani, San Francisco, CA (US); Woojong Han, Phoenix, AZ (US); Ken Shoemaker, Los Altos Hills, CA (US); Madhu Athreya, Saratoga, CA (US); Mahesh Wagh, Portland, OR (US); Shreekant S. Thakkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 297 days.

This patent is subject to a terminal disclaimer.

(21) Appl. No.: 14/261,934

(22) Filed: Apr. 25, 2014

(65) Prior Publication Data

US 2014/0237154 A1 Aug. 21, 2014

Related U.S. Application Data

(63) Continuation of application No. 13/891,501, filed on May 10, 2013, now Pat. No. 8,745,303, which is a
(Continued)

(51) Int. Cl.
| | | |
|---|---|---|
| G06F 13/20 | (2006.01) | |
| G06F 13/40 | (2006.01) | |
| G06F 13/42 | (2006.01) | |

(52) U.S. Cl.
CPC ........ *G06F 13/4022* (2013.01); *G06F 13/404* (2013.01); *G06F 13/4045* (2013.01); *G06F 13/42* (2013.01); *G06F 13/4027* (2013.01)

(58) Field of Classification Search
USPC .................................. 710/305–313, 104–110
See application file for complete search history.

(56) References Cited

U.S. PATENT DOCUMENTS

| | | |
|---|---|---|
| 6,009,488 A | 12/1999 | Kavipurapu |
| 6,694,380 B1 | 2/2004 | Wolrich et al. |
| (Continued) | | |

FOREIGN PATENT DOCUMENTS

| | | |
|---|---|---|
| CN | 1690996 | 11/2005 |
| TW | 200500620 A | 1/2005 |
| (Continued) | | |

OTHER PUBLICATIONS

U.S. Patent and Trademark Office, Notice of Allowance mailed Jan. 7, 2013 in U.S. Appl. No. 13/483,237.

(Continued)

*Primary Examiner* — Raymond Phan
(74) *Attorney, Agent, or Firm* — Trop, Pruner & Hu, P.C.

(57) ABSTRACT

In one embodiment, the present invention includes an apparatus having an adapter to communicate according to a personal computer (PC) protocol and a second protocol. A first interface coupled to the adapter is to perform address translation and ordering of transactions received from upstream of the adapter. The first interface is coupled in turn to heterogeneous resources, each of which includes an intellectual property (IP) core and a shim, where the shim is to implement a header of the PC protocol for the IP core to enable its incorporation into the apparatus without modification. Other embodiments are described and claimed.

20 Claims, 2 Drawing Sheets

Related U.S. Application Data continuation of application No. 13/477,631, filed on May 22, 2012, now Pat. No. 8,463,975, which is a continuation of application No. 13/180,697, filed on Jul. 12, 2011, now Pat. No. 8,209,456, which is a continuation of application No. 12/841,889, filed on Jul. 22, 2010, now Pat. No. 8,010,731, which is a continuation of application No. 12/080,076, filed on Mar. 31, 2008, now Pat. No. 7,783,819.

(56) References Cited

U.S. PATENT DOCUMENTS

| | | | |
|---|---|---|---|
| 6,810,460 B1 | 10/2004 | Kirkwood | |
| 6,816,938 B2 | 11/2004 | Edara et al. | |
| 6,848,057 B2 | 1/2005 | Hicok | |
| 6,986,074 B2 | 1/2006 | Alia et al. | |
| 7,254,603 B2 | 8/2007 | Weber et al. | |
| 7,277,975 B2 | 10/2007 | Vinogradov et al. | |
| 7,457,905 B2 | 11/2008 | Gehman | |
| 7,506,089 B2 | 3/2009 | Cho et al. | |
| 7,783,819 B2 * | 8/2010 | Mandhani | G06F 13/404 710/105 |
| 8,010,731 B2 * | 8/2011 | Mandhani | G06F 13/404 710/105 |
| 8,032,676 B2 | 10/2011 | Wingard et al. | |
| 8,209,456 B2 * | 6/2012 | Mandhani | G06F 13/404 710/105 |
| 8,250,280 B1 | 8/2012 | Rohana et al. | |
| 8,463,975 B2 * | 6/2013 | Mandhani | G06F 13/404 710/105 |
| 2005/0177664 A1 | 8/2005 | Cho et al. | |
| 2005/0289369 A1 | 12/2005 | Chung et al. | |
| 2005/0289374 A1 | 12/2005 | Kim et al. | |
| 2006/0184350 A1 | 8/2006 | Huang et al. | |
| 2007/0067549 A1 | 3/2007 | Gehman | |
| 2007/0260965 A1 | 11/2007 | Schimidt et al. | |
| 2008/0082840 A1 | 4/2008 | Kendall et al. | |
| 2008/0147858 A1 | 6/2008 | Prakash et al. | |
| 2008/0235415 A1 | 9/2008 | Clark et al. | |
| 2009/0235099 A1 | 9/2009 | Branover et al. | |
| 2009/0249098 A1 | 10/2009 | Han et al. | |
| 2009/0300245 A1 | 12/2009 | Shoemaker et al. | |
| 2012/0239839 A1 | 9/2012 | Shoemaker et al. | |
| 2013/0297846 A1 | 11/2013 | Mandhani et al. | |

FOREIGN PATENT DOCUMENTS

| | | |
|---|---|---|
| TW | 200629080 A | 8/2006 |
| TW | 200643751 | 12/2006 |
| TW | 200743976 | 12/2007 |
| TW | 200810413 | 2/2008 |

OTHER PUBLICATIONS

U.S. Patent and Trademark Office, Office Action mailed Sep. 20, 2012 with Reply filed on Dec. 17, 2012 in U.S. Appl. No. 13/483,237.
U.S. Patent and Trademark Office, Notice of Allowance mailed Jun. 10, 2011 in U.S. Appl. No. 12/947,307.
U.S. Patent and Trademark Office, Office Action mailed Feb. 11, 2011 with Reply filed May 11, 2011 in U.S. Appl. No. 12/947,307.
U.S. Patent and Trademark Office, Notice of Allowance mailed Apr. 21, 2011 in U.S. Appl. No. 12/841,889.
U.S. Patent and Trademark Office, Office Action mailed Dec. 27, 2010 with Reply filed Mar. 28, 2011 in U.S. Appl. No. 12/841,889.
Sousek, et al., "PCI Express Core Integration with the OCP Bus," CAST, Inc., 2006, 15 pages.
Mentor Graphics, "PCI Express to AMBA 3 AXI Bridge IP," Mentor Graphics, Jun. 2007, 2 pages.
U.S. Patent and Trademark Office, Office Action mailed May 11, 2010 in U.S. Appl. No. 12/156,320.
Everton Carara, et al., "Communication Models in Networks-on-Chip," 2007, pp. 57-65.
U.S. Patent and Trademark Office, Notice of Allowance mailed Aug. 30, 2010 in U.S. Appl. No. 12/156,320.
Reply to Office Action mailed May 11, 2010 filed on Aug. 6, 2010 in U.S. Appl. No. 12/156,320.
Taiwan Patent Office, Taiwanese Office Action mailed Mar. 13, 2015, in Taiwanese Patent Application No. 102135101. (Redacted).
Taiwan Intellectual Property Office, Official Letter mailed Jun. 28, 2016 in Taiwanese Patent Application No. 104131602. (Redacted).

\* cited by examiner

SYSTEM, APPARATUS AND METHOD FOR INTEGRATING NON-PERIPHERAL COMPONENT INTERCONNECT (PCI) RESOURCES INTO A PERSONAL COMPUTER SYSTEM

This application is a continuation of U.S. patent application Ser. No. 13/891,501, filed Mar. 10, 2013, which is a continuation of U.S. patent application Ser. No. 13/477,631, filed May 22, 2012, now U.S. Pat. No. 8,463,975, issued Jun. 11, 2013, which is a continuation of U.S. patent application Ser. No. 13/180,697, filed Jul. 12, 2011, now U.S. Pat. No. 8,209,456, issued Jun. 26, 2012, which is a continuation of U.S. patent application Ser. No. 12/841,889, filed Jul. 22, 2010, now U.S. Pat. No. 8,010,731, which is a continuation of U.S. patent application Ser. No. 12/080,076, filed Mar. 31, 2008, now U.S. Pat. No. 7,783,819, the content of which is hereby incorporated by reference.

BACKGROUND

Certain semiconductor architectures such as advanced extensible interface (AXI) and open core protocol (OCP)-based architectures are modular and allow for rapid proliferation by quickly adding or deleting intellectual property (IP) blocks from an existing design. The key elements that make this possible are an interconnect fabric that can be automatically generated for a given configuration, and a large ecosystem of IP blocks that all implement the same standard interface and can be seamlessly plugged into these fabrics.

Though these IP blocks (also referred to as IPs) offer a rich set of functionality, they cannot be used in a personal computer (PC) system, as they lack some key features required for peripheral component interconnect (PCI) compatibility. For example, these IPs operate at fixed addresses, precluding plug-and-play; there is no mechanism for discovery and enumeration; PCI-style ordering is not implemented; and PCI-style power management features are missing.

DETAILED DESCRIPTION

Embodiments use a technique that enables use of heterogeneous resources, such as AXI/OCP technologies, in a PC-based system such as a PCI-based system without making any changes to the IP resources themselves. Embodiments provide two very thin hardware blocks, referred to herein as a Yunit and a shim, that can be used to plug AXI/OCP IP into an auto-generated interconnect fabric to create PCI-compatible systems. As will be described below, in one embodiment a first (e.g., a north) interface of the Yunit connects to an adapter block that interfaces to a PCI-compatible bus such as a direct media interface (DMI) bus, a PCI bus, or a Peripheral Component Interconnect Express (PCIe) bus. A second (e.g., south) interface connects directly to a non-PC interconnect, such as an AXI/OCP interconnect. In various implementations, this bus may be an OCP bus.

The Yunit implements PCI enumeration by translating PCI configuration cycles into transactions that the target IP can understand. This unit also performs address translation from re-locatable PCI addresses into fixed AXI/OCP addresses and vice versa. The Yunit may further implement an ordering mechanism to satisfy a producer-consumer model (e.g., a PCI producer-consumer model).

In turn, individual IPs are connected to the interconnect via dedicated PCI shims. Each shim may implement the entire PCI header for the corresponding IP. The Yunit routes all accesses to the PCI header and the device memory space to the shim. The shim consumes all header read/write transactions and passes on other transactions to the IP. In some embodiments, the shim also implements all power management related features for the IP.

Figure 1:
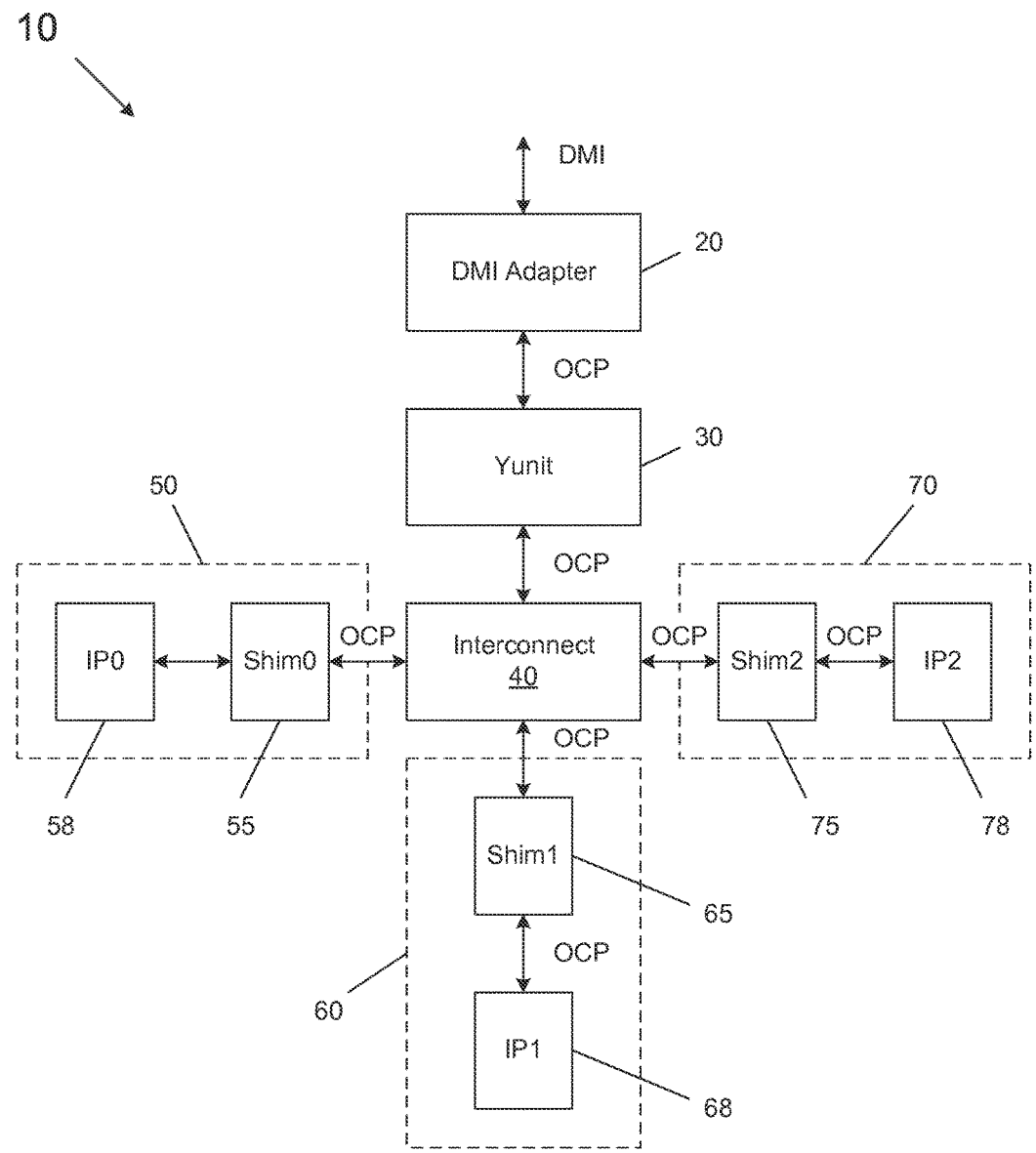
FIG. 1 is a block diagram of a processor in accordance with one embodiment of the present invention.

Referring now to FIG. 1, shown is a block diagram of a processor in accordance with one embodiment of the present invention. As shown in FIG. 1, processor 10 may be a system on a chip (SoC) or other integrated circuit that can be formed on a single semiconductor die. In the embodiment of FIG. 1, processor 10 may include various heterogeneous resources that can be coupled to an interface to provide the ability to communicate and control these various heterogeneous resources using standard PC signaling mechanisms, such as a PCI protocol, although the scope of the present invention is not limited in this regard.

As shown in FIG. 1, processor 10 may include an adapter 20 which, in one embodiment may be a DMI adapter having a first interface that can communicate according to a given protocol, e.g., a DMI protocol. However in other implementations adapter 20 may communicate using this first interface according to a PCI, PCIe or other such PC-based communication protocol. Accordingly, communications with an upstream component, which may be another part of the SoC, or a different component such as a chipset component of a PC, e.g., an input/output controller hub (ICH) may occur according to the given PC protocol, e.g., the DMI protocol shown in FIG. 1.

In turn, downstream communications can occur according to a non-PC communication protocol such as the OCP protocol shown in FIG. 1, although other implementations are certainly possible.

Adapter 20 communicates with a Yunit 30, which as described above may handle various PCI or other such PC-based operations. On its downstream side Yunit 30 may be coupled to an interconnect 40, which may provide interconnection and routing of communications between Yunit 30 and a plurality of different heterogeneous resources. In the embodiment shown in FIG. 1, such resources include a first resource 50, a second resource 60, and a third resource 70, each of which may represent a given heterogeneous resource such as a given IP block of one or more third parties. Each heterogeneous resource may be configured differently to perform one or more specialized functions.

Still referring to FIG. 1, interconnect 40 may be coupled to each resource via an interconnect, e.g., an OCP interconnect. Each resource includes a shim to connect the resource to interconnect 40. The shims may be used to perform all PCI-related operations, such that communication between the shim and the respective IP block of the resource can be by the underlying protocol of the IP block. Thus as shown in FIG. 1, resource 50 includes a shim 55 coupled to an IP block 58 by an interconnect such as an OCP-based interconnect. Similarly, resource 60 includes a shim 65 coupled to an IP block 68 by a OCP interconnect. Also shown in FIG. 1 is a resource 70 that includes a shim 75 coupled to an IP block 78 by an OCP interconnect. While shown with this particular implementation in the embodiment of FIG. 1, the scope of the present invention is not limited in this regard.

Thus, rather than being a monolithic compatibility block, embodiments that implement a Yunit take a distributed approach. Functionality that is common across all IPs, e.g., address translation and ordering, is implemented in the Yunit, while IP-specific functionality such as power management, error handling, and so forth, is implemented in the shims that are tailored to that IP.

In this way, a new IP can be added with minimal changes to the Yunit. For example, in one implementation the changes may occur by adding a new entry in an address redirection table. While the shims are IP-specific, in some implementations a large amount of the functionality (e.g., more than 90%) is common across all IPs. This enables a rapid reconfiguration of an existing shim for a new IP.

Embodiments thus also enable use of auto-generated interconnect fabrics without modification. In a point-to-point bus architecture, designing interconnect fabrics can be a challenging task. The Yunit approach described above leverages an industry ecosystem into a PCI system with minimal effort and without requiring any modifications to industry-standard tools.

Figure 2:
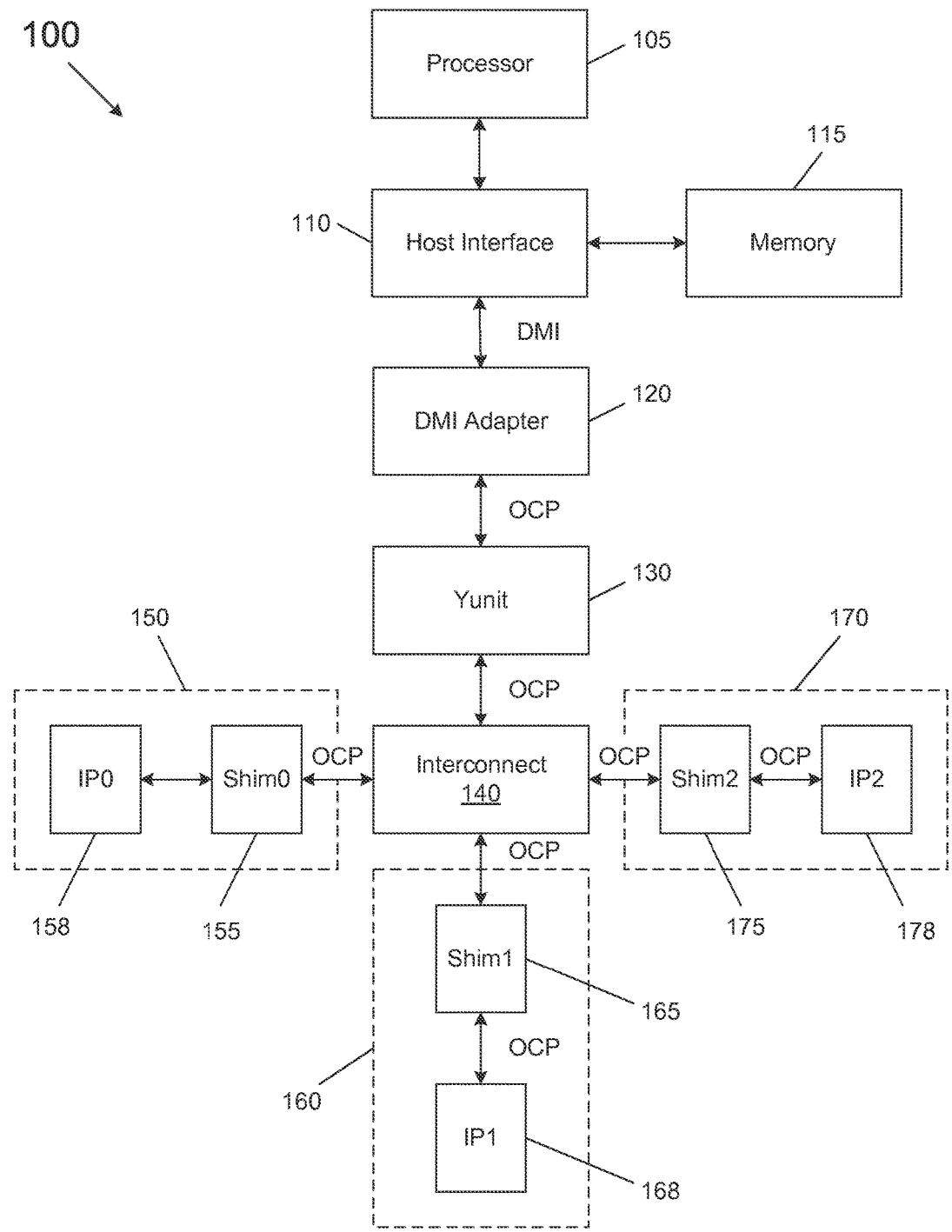
FIG. 2 is a block diagram of a system in accordance with one embodiment of the present invention.

FIG. 2 is a block diagram of a system in accordance with one embodiment of the present invention. System 100 may be a PC-based system, such as a PCI-based system that can be implemented in different form factors, from a desktop system to a laptop to an ultra-mobile PC. As shown in FIG. 2, system 100 includes a processor 105 coupled to a host interface 110, which in turn is coupled to a memory 115, such as a dynamic random access memory (DRAM), and in turn to DMI adapter 120, e.g., via a DMI bus. Processor 105 may be, in some embodiments, a low power processor that can execute a PC-based operating system (OS) such as a WINDOWS™ or LINUX™ OS that uses a PCI or other such PC protocol, although certain components of the system may be of another protocol, e.g., AXI or OCP.

Adapter 120 communicates with a Yunit 130, which as described above may handle various PCI or other such PC-based operations. On its downstream side Yunit 130 may be coupled to an interconnect 140 to provide interconnection and routing of communications between Yunit 130 and different heterogeneous resources. In the embodiment shown in FIG. 2, such resources include a first resource 150, a second resource 160, and a third resource 170, each of which may represent a given heterogeneous resource such as a given IP block of one or more third parties.

Still referring to FIG. 2, interconnect 140 may be coupled to each resource via an OCP interconnect. Each resource includes a shim to connect the resource to interconnect 140. The shims may be used to perform all PCI-related operations, such that communication between the shim and the respective IP block of the resource can be by the underlying protocol of the IP block. Thus as shown in FIG. 2, resource 150 includes a shim 155 coupled to an IP block 158 by an OCP-based interconnect. Similarly, resource 160 includes a shim 165 coupled to an IP block 168 by an OCP interconnect. Also shown in FIG. 2 is a resource 170 that includes a shim 175 coupled to an IP block 178 by an OCP interconnect. While shown with this particular implementation in the embodiment of FIG. 2, the scope of the present invention is not limited in this regard.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
an adapter adapted on a single semiconductor die to communicate with a first component via a first interconnect compatible with a first protocol and to communicate with an interface via a second interconnect compatible with a second protocol;
the interface adapted on the single semiconductor die and coupled to the adapter, the interface to perform enumeration for a plurality of heterogeneous resources coupled to a third interconnect; and
the third interconnect adapted on the single semiconductor die to provide interconnection and routing of communications between the interface and the plurality of heterogeneous resources, each including an intellectual property (IP) core and a shim, wherein the shim is to couple between the IP core and the third interconnect, the processor to operate in accordance with the first protocol and the IP core to operate in accordance with the second protocol.

2. The processor of claim 1, wherein the interface is to translate configuration cycles of the first protocol into a format for the second protocol, wherein the first protocol is a peripheral component interconnect (PCI)-compliant protocol.

3. The processor of claim 1, wherein the interface is to perform operations that are common across the plurality of heterogeneous resources, and each shim is to perform operations that are specific to the corresponding IP core, wherein the shim is to communicate with the corresponding IP core in accordance with the second protocol.

4. The processor of claim 1, wherein the third interconnect comprises an auto-generated interconnect fabric.

5. The processor of claim 1, wherein the interface is to route accesses to a header to a corresponding shim, and the shim is to implement the header for the corresponding IP core, wherein the interface is to further route accesses to a device memory space to the corresponding shim.

6. The processor of claim 1, wherein at least one of the plurality of heterogeneous resources is of a third party.

7. The processor of claim 1, wherein the processor comprises a system on a chip (SoC) and wherein the SoC is to couple to a second processor, the second processor to execute a personal computer-based operating system.

8. The processor of claim 2, wherein the PCI-compliant protocol comprises a PCI Express protocol.

9. The processor of claim 3, wherein the common operations include address translation and ordering of transactions received from the first component, and the specific operations include power management and error handling.

10. The processor of claim 5, wherein the corresponding shim is to consume read-write operations to the header and to communicate other transactions to the corresponding IP core.

11. The processor of claim 2, wherein the interface is to perform address translation to translate a re-locatable PCI address into a fixed advanced extensible interface (AXI)/open core protocol (OCP) address and to translate the fixed AXI/OCP address into the relocatable PCI address.

12. The processor of claim 9, wherein the ordering is to satisfy a producer-consumer model of the first protocol.

13. A system-on-chip (SoC) comprising:
a processor adapted on a semiconductor die;
a host interface adapted on the semiconductor die to couple to the processor, the host interface to couple the processor to a memory and an adapter;
the adapter to couple to the host interface to communicate with the host interface via a first interconnect to operate according to a peripheral component interconnect express (PCIe)-compatible protocol and to communicate with a second interface via a second interconnect to operate according to an advanced extensible interface (AXI)/open core protocol (OCP)-compatible protocol;
the second interface adapted on the semiconductor die to couple to the adapter, the second interface to perform common functionality for a plurality of heterogeneous resources to couple to a third interconnect; and
the third interconnect adapted on the semiconductor die to couple the second interface to the plurality of heterogeneous resources, each of the plurality of heterogeneous resources including a core and an interface logic, wherein the SoC is to operate according to the PCIe-compatible protocol and at least one of the cores is to operate according to the AXI/OCP protocol.

14. The SoC of claim 13, further comprising a system comprising an ultra mobile system, wherein the processor is to execute using the PCIe-compatible protocol.

15. The SoC of claim 13, wherein the second interface includes an address redirection table.

16. The SoC of claim 14, wherein the second interface is to translate configuration cycles from the processor into a format for the AXI/OCP protocol, the second interface to perform address translation to translate a re-locatable PCIe address into an OCP address.

17. The SoC of claim 16, wherein each interface logic is to perform operations that are specific to the corresponding core, the common functionality including address translation and ordering of transactions received from the processor, and the specific operations including power management and error handling.

18. A machine-readable medium having stored thereon instructions, which if performed by a machine cause the machine to perform a method comprising:
communicating, via an adapter of a system on a chip (SoC), with a first component according to a peripheral component interconnect (PCI)-compatible protocol and communicating with a first interface according to a second protocol;
performing address translation and ordering of transactions received from the first component in the first interface;
translating configuration cycles of the PCI-compatible protocol into a format for the second protocol; and
communicating between the first interface and a plurality of heterogeneous resources, via an interconnect, each of the plurality of heterogeneous resources including a core and an interface logic, wherein the SoC is to operate according to the PCI-compatible protocol and at least some of the cores to operate according to the second protocol.

19. The machine-readable medium of claim 18, wherein the method further comprises performing the address translation to translate a re-locatable address into a fixed address.

20. The machine-readable medium of claim 18, wherein the method further comprises performing operations that are common across the plurality of heterogeneous resources in the first interface, and performing operations that are specific to the corresponding core in the corresponding interface logic.

* * * * *